US008574337B2

(12) United States Patent
Viswanathan (10) Patent No.: US 8,574,337 B2
(45) Date of Patent: Nov. 5, 2013

(54) RENEWABLE RESOURCE-BASED METAL-CONTAINING MATERIALS AND APPLICATIONS OF THE SAME

(75) Inventor: Tito Viswanathan, Little Rock, AR (US)

(73) Assignee: Board of Trustees of the University of Arkansas, Little Rock, AR (US)

(*) Notice: Subject to any disclaimer, the term of this patent is extended or adjusted under 35 U.S.C. 154(b) by 172 days.

(21) Appl. No.: 13/335,418

(22) Filed: Dec. 22, 2011

(65) Prior Publication Data

US 2012/0121821 A1 May 17, 2012

Related U.S. Application Data

(63) Continuation-in-part of application No. 12/487,174, filed on Jun. 18, 2009, now Pat. No. 8,167,973, and a continuation-in-part of application No. 12/487,323, filed on Jun. 18, 2009, and a continuation-in-part of application No. 13/069,097, filed on Mar. 22, 2011, which is a continuation-in-part of application No. 12/487,323, filed on Jun. 18, 2009.

(60) Provisional application No. 61/132,380, filed on Jun. 18, 2008, provisional application No. 61/316,669, filed on Mar. 23, 2010.

(51) Int. Cl.
*B22F 1/00* (2006.01)
*B22F 9/24* (2006.01)

(52) U.S. Cl.
USPC .............. 75/345; 75/351; 75/362; 977/773; 977/788

(58) Field of Classification Search
USPC .................. 75/345, 351, 362; 977/773, 788
See application file for complete search history.

(56) References Cited

U.S. PATENT DOCUMENTS

| 3,148,161 | A | 9/1964 | Wentorf, Jr. et al. |
| 3,803,033 | A | 4/1974 | Sutherland |
| 3,886,093 | A | 5/1975 | Dimitri |

(Continued)

FOREIGN PATENT DOCUMENTS

| CN | 1876566 A | 12/2006 |
| CN | 1911792 A | 2/2007 |

(Continued)

OTHER PUBLICATIONS

Antal et al., Flash carbonization of biomass, Industrial & Engineering Chemistry Research, 2003, 42(16), 3690-3699.

(Continued)

*Primary Examiner* — George Wyszomierski
*Assistant Examiner* — Tima M McGuthry Banks
(74) *Attorney, Agent, or Firm* — Morris, Manning & Martin, LLP; Tim Tingkang Xia, Esq.

(57) ABSTRACT

A method of producing carbon-metal nanocomposites includes (a) treating a material containing at least one o-catechol unit with a first solution of hexamine such that the material becomes hexamine treated; (b) treating the material with a second solution having a plurality of metal ions such that the material becomes metal treated; (c) treating the material with a third solution of alkali such that the material becomes alkali treated; and (d) heating the alkali, metal and hexamine treated material after (a), (b), and (c) for a predetermined period of time such that a plurality of carbon-metal nanocomposites having metal nanoparticles dispersed in the material are produced.

37 Claims, 7 Drawing Sheets

(56) References Cited

U.S. PATENT DOCUMENTS

| | | |
|---|---|---|
| 4,019,995 A | 4/1977 | Briggs |
| 4,108,767 A | 8/1978 | Cooper |
| 4,457,853 A | 7/1984 | Detroit |
| 4,985,225 A | 1/1991 | Hashimoto et al. |
| 5,604,037 A | 2/1997 | Ting |
| 5,609,683 A | 3/1997 | Pike-Biegunski |
| 5,972,537 A | 10/1999 | Mao |
| 6,099,990 A | 8/2000 | Denton |
| 6,232,264 B1 | 5/2001 | Lukehart |
| 6,486,008 B1 | 11/2002 | Lee |
| 6,733,827 B2 | 5/2004 | Mitchell et al. |
| 6,764,617 B1 | 7/2004 | Viswanathan |
| 7,119,179 B1 | 10/2006 | Huynh et al. |
| 7,220,484 B2 | 5/2007 | Ton-That |
| 7,297,652 B2 | 11/2007 | Jhung |
| 7,303,679 B2 | 12/2007 | Ulicny |
| 7,358,325 B2 | 4/2008 | Hayes |
| 7,758,756 B2 | 7/2010 | Kim |
| 2002/0064495 A1 | 5/2002 | Miura et al. |
| 2004/0147397 A1 | 7/2004 | Miller et al. |
| 2005/0139550 A1 | 6/2005 | Ulicny |
| 2005/0181941 A1 | 8/2005 | Sugo et al. |
| 2005/0186344 A1 | 8/2005 | Takagi |
| 2005/0271816 A1 | 12/2005 | Meschke |
| 2007/0129233 A1 | 6/2007 | Ueno et al. |
| 2007/0142225 A1 | 6/2007 | Baker |
| 2007/0218564 A1 | 9/2007 | Bachmann et al. |
| 2007/0243337 A1 | 10/2007 | Xiong |
| 2007/0264574 A1 | 11/2007 | Kim |
| 2007/0266825 A1 | 11/2007 | Ripley |
| 2008/0017291 A1 | 1/2008 | Shin et al. |
| 2008/0160306 A1 | 7/2008 | Mushtaq et al. |
| 2009/0038858 A1 | 2/2009 | Griffo et al. |
| 2010/0015030 A1 | 1/2010 | Mamakhel et al. |
| 2010/0200501 A1 | 8/2010 | Hoag |
| 2010/0283005 A1 | 11/2010 | Pickett et al. |

FOREIGN PATENT DOCUMENTS

| | | |
|---|---|---|
| CN | 101402057 A | 4/2009 |
| WO | 0123501 A1 | 4/2001 |
| WO | 2008127757 A2 | 10/2008 |

OTHER PUBLICATIONS

Bao et al., A novel nanostructure of nickel nanotubes encapsulated in carbon nanotubes, Chemical Communications, Cambridge, United Kingdom, 2003, (2), 208-209.

Bender et al., Total Phosphorous in Residual Materials, In Methods of Phosphorus Analysis for Soils, Sediments, Residuals, and Waters, Pierzynski, G.M., Ed. Southern Cooperative Series Bulletin No. 396. 2000.

Chen et al., Microwave-assisted synthesis of carbon supported Pt Nanoparticles for fuel cell applications, Chemical Communications, Cambridge, United Kingdom, 2002, (21), 2588-2589.

Compere et al., Low cost carbon fiber from renewable resources, Oak Ridge National Laboratory, Oak Ridge TN, USA, International Sampe Technical Conference, 2001, 33, 1306-1314, Society for the Advancement of Material and Process Engineering.

Hu et al., Microwave-assisted synthesis of a superparamagnetic surface-functionalized porous Fe3O4/C nanocomposite, Chemistry—An Asia Journal, 2006, 1(4), 605-610.

Kang et al., Obtaining carbon nanotubes from grass, Nanotechnology, 2005, 16(8), 1192-1195.

Kubo et al., Carbon fibers from Lignin-recyclable plastic blends, Encyclopedia of Chemical Processing, vol. 1, 2003, Sunggyu Lee, CRC Press pp. 317-332.

Lagashetty et al., Microwave-assisted route for synthesis of nanosized metal oxides, Science and Technology of Advanced Materials, 2007, 8(6), 484-493.

Liu, Shuling; Liu, Xinzheng; Xu, Liqiang; Qian, Yitai; Ma, Xicheng. Controlled synthesis and characterization of nickel phosphide nanocrystal. Journal of Crystal Growth (2007), 304(2), 430-434.

Marina Sofos et al., A synergistic assembly of nanoscale lamellar photoconductor hybrids, Nature Materials, 2009, 68-75, vol. 8, Nature Publishing Group.

Mayo JT, Yavuz C, Yean S, Cong L, Shipley H, Yu W, Falkner J, Kan A, Tomson M, Colvin VL, The effect of nanocrystalline magnetite size on arsenic removal, Science and Technology of Advanced Materials (2007), 8(1-2), 71-75.

Meng Qinghan et al., Copper-doped mesoporous activated carbons as electrode material for electrochemical capacitors, Journal of Applied Electrochemistry, 2006, 36(1), 63-67.

Osswald et al., Control of sp2/sp3 Carbon Ratio and Surface Chemistry of Nanodiamond Powders by Selective Oxidation in Air, J. Am. Chem. Soc., 2006, 128(35), pp. 11635-11642.

Oyama, Novel catalysts for advanced hydroprocessing: transition metal phosphides, Journal of Catalysis, 2003, 216 (1-2), 343-352.

Oyama, S. T.; Wang, X.; Requejo, F. G.; Sato, T.; Yoshimura, Y. Hydrodesulfurization of Petroleum Feedstocks with a New Type of Nonsulfide Hydrotreating Catalyst. Journal of Catalysis (2002), 209(1), 1-5.

Oyama, S. Ted; Lee, Yong-Kul. Mechanism of Hydrodenitrogenation on Phosphides and Sulfides. Journal of Physical Chemistry B (2005), 109(6), 2109-2119.

Rao et al., Synthesis of Inorganic Solids Using Microwaves, Chemistry of Materials, 1999, 11(4), 882-895.

Shipley HJ, Yean S, Kan AT, Tomson MB, Adsorption of arsenic to magnetite nanoparticles: effect of particle concentration, pH, ionic strength, and temperature, Environmental Toxicology and Chemistry (2009), 28(3), 509-515.

Vaclavikova M, Gallios GP, Hredzak S, Jakabsky S, Removal of arsenic from water streams: an overview of available techniques, Clean Technologies and Environmental Policy (2008), 10(1), 89-95.

Vivas, N.; Bourgeois, G.; Vitry, C.; Glories, Y.; de Freitas, V., "Determination of the composition of commercial tannin extracts by liquid secondary ion mass spectrometry" J. Sci. Food Agric., 1996, 72, 309-317.

Walkiewicz et al., Microwave heating characteristics of selected minerals and compounds, Minerals & Metallurgical Processing, 1988, 5(1), 39-42.

Wang, Xinjun; Han, Kun; Gao, Youjun; Wan, Fuquan; Jiang, Kai. Fabrication of novel copper phosphide (Cu3P) hollow spheres by a simple solvothermal method. Journal of Crystal Growth (2007), 307(1), 126-130.

Wei Liu et al., A Novel Carbothermal Method for the Preparation of Nano-sized WC on High Surface Area Carbon, Chemistry Letters, 2006, 1148-1149, vol. 35, No. 10, The Chemical Society of Japan, Tsukuba, Japan.

Xie, Songhai; Qiao, Minghua; Zhou, Wuzong; Luo, Ge; He, Heyong; Fan, Kangnian; Zhao, Tiejun; Yuan, Weikang. Controlled synthesis, characterization, and crystallization of Ni—P nanospheres. Journal of Physical Chemistry B (2005), 109(51), 24361-24368.

Xu et al., Preparation and characterization of NiO nanorods by thermal decomposition of NiC2O4 precursor, Journal of Materials Science, 2003, 38(4), 779-782.

Yu et al., Microwaved-assisted synthesis and in-situ self-assembly of coaxial Ag/C nanotubes, Chemical Communications, Cambridge, United Kingdom, 2005, 21, 2704-2706.

Zhang et al., Microwave synthesis of nanocarbons from conducting polymers, Chemical Communications, Cambridge, United Kingdom, 2006, (23), 2477-2479.

Zhu et al., Enhanced field emission from O2 and CF4 plasma-treated CuO nanowires, Chemical Physics Letters, 2006, 419(4-6), 458-463.

RENEWABLE RESOURCE-BASED METAL-CONTAINING MATERIALS AND APPLICATIONS OF THE SAME

CROSS-REFERENCE TO RELATED PATENT APPLICATION

This application is a continuation-in-part of U.S. patent application Ser. No. 13/069,097, filed on Mar. 22, 2011, entitled "METHODS OF SYNTHESIZING CARBON-MAGNETITE NANOCOMPOSITES FROM RENEWABLE RESOURCE MATERIALS AND APPLICATION OF SAME" by Tito Viswanathan, which is incorporated herein by reference in its entirety and which claims the benefit, pursuant to 35 U.S.C. §119(e), of U.S. provisional patent application Ser. No. 61/316,669, filed Mar. 23, 2010, entitled "USE OF MAGNETIC CARBON COMPOSITES FROM RENEWABLE RESOURCE MATERIALS FOR REMOVAL OF ARSENIC FROM CONTAMINATED WATER," by Tito Viswanathan, which is incorporated herein by reference in its entirety.

This application is also a continuation-in-part of U.S. patent application Ser. No. 12/487,323, filed on Jun. 18, 2009, entitled "MICROWAVE-ASSISTED SYNTHESIS OF CARBON AND CARBON-METAL COMPOSITES FROM LIGNIN, TANNIN AND ASPHALT DERIVATIVES AND APPLICATIONS OF SAME," by Tito Viswanathan, which is incorporated herein by reference in its entirety and which claims the benefit, pursuant to 35 U.S.C. §119(e), of U.S. provisional patent application Ser. No. 61/132,380, filed Jun. 18, 2008, entitled "MICROWAVE-ASSISTED SYNTHESIS OF CARBON AND CARBON-METAL COMPOSITES FROM LIGNIN, TANNIN AND ASPHALT DERIVATIVES," by Tito Viswanathan, which is incorporated herein by reference in its entirety.

This application is also a continuation-in-part of U.S. patent application Ser. No. 12/487,174, filed on Jun. 18, 2009, entitled "MICROWAVE-ASSISTED SYNTHESIS OF CARBON AND CARBON-METAL COMPOSITES FROM LIGNIN, TANNIN AND ASPHALT DERIVATIVES," by Tito Viswanathan, now U.S. Pat. No. 8,167,973, which is incorporated herein by reference in its entirety and which claims the benefit, pursuant to 35 U.S.C. §119(e), of U.S. provisional patent application Ser. No. 61/132,380, filed Jun. 18, 2008, entitled "MICROWAVE-ASSISTED SYNTHESIS OF CARBON AND CARBON-METAL COMPOSITES FROM LIGNIN, TANNIN AND ASPHALT DERIVATIVES," by Tito Viswanathan, which is incorporated herein by reference in its entirety.

STATEMENT OF FEDERALLY-SPONSORED RESEARCH

This disclosure was made with Government support under SURF grant No. 08-EPSCOR-009-REU awarded by NSF-EPSCOR and grant No. DEFC 36-06G086072 awarded by DOE. The Government has certain rights in the disclosure.

This application is related to copending U.S. patent application Ser. No. 13/069,132, filed on Mar. 22, 2011, entitled "MICROWAVE-ASSISTED SYNTHESIS OF CARBON NANOTUBES FROM TANNIN, LIGNIN, AND DERIVATIVES," by Tito Viswanathan, which is incorporated herein by reference in its entirety and which claims the benefit, pursuant to 35 U.S.C. §119(e), of U.S. provisional patent application Ser. No. 61/316,682, filed on Mar. 23, 2010, entitled "MICROWAVE-ASSISTED SYNTHESIS OF CARBON NANOTUBES FROM TANNIN, LIGNIN, AND DERIVATIVES," by Tito Viswanathan, which is incorporated herein by reference in its entirety.

This application is also related to U.S. patent application Ser. No. 13/069,057, filed on Mar. 22, 2011, entitled "MICROWAVE-ASSISTED SYNTHESIS OF NANODIAMONDS FROM TANNIN, LIGNIN, ASPHALT AND DERIVATIVES," by Tito Viswanathan, which is incorporated herein by reference in its entirety and which claims the benefit, pursuant to 35 U.S.C. §119(e), of U.S. provisional patent application Ser. No. 61/316,654, filed Mar. 23, 2010, entitled "MICROWAVE-ASSISTED SYNTHESIS OF NANODIAMONDS FROM TANNIN, LIGNIN, ASPHALT AND DERIVATIVES," by Tito Viswanathan, which is incorporated herein by reference in its entirety.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to a method or process of producing carbon-metal nanocomposites, and carbon-metal nanocomposites having nanoparticles embedded in a renewable resource-based material as well as synthetic materials.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In certain aspects, nanoparticles are superior to conventional large particles due to, among other things, their great surface area per weight. Therefore, there is a need to develop different material with nanostructures according to specific requirements for variety of applications to improve their efficiency. Carbon-metal nanocomposites having nanoparticles represent a new class of materials with niche applications in a variety of areas.

SUMMARY

Certain aspects of the present disclosure are directed to a method of producing carbon-metal nanocomposites. The method includes (a) treating a material containing at least one o-catechol unit with a first solution of hexamine such that the material becomes hexamine treated; (b) treating the material with a second solution having a plurality of metal ions such that the material becomes metal treated; (c) treating the material with a third solution of alkali such that the material becomes alkali treated; and (d) heating the alkali, metal and hexamine treated material after (a), (b), and (c) for a predetermined period of time such that a plurality of carbon-metal nanocomposites having metal nanoparticles dispersed in the material are produced.

Further, in accordance with certain aspects of the present disclosure, the method includes impregnating the material with at least one o-catechol unit.

Further, in accordance with certain aspects of the present disclosure, the method includes subjecting the alkali, metal and hexamine treated material to microwave radiation for a predetermined period of time effective to produce the plurality of carbon-metal nanocomposites.

Further, in accordance with certain aspects of the present disclosure, the method includes heating the alkali, metal and hexamine treated material using a non-microwave technique at a predetermined temperature for a predetermined period of time effective to produce the plurality of carbon-metal nanocomposites.

Certain aspects of the present disclosure are directed to a method including (a) treating a material containing at least one o-catechol unit with a plurality of metal ions, the material being a matrix material; (b) treating the material with alkali; and (c) heating the alkali and metal treated material for a predetermined period of time effective such that a plurality of carbon-metal nanocomposites having metal nanoparticles dispersed in the material are produced.

Further, in accordance with certain aspects of the present disclosure, the method includes subjecting the alkali and metal treated material to microwave radiation for a predetermined period of time effective to produce the plurality of carbon-metal nanocomposites.

Further, in accordance with certain aspects of the present disclosure, the method includes heating the alkali and metal treated material using a non-microwave technique at a predetermined temperature for a predetermined period of time effective to produce the plurality of carbon-metal nanocomposites.

Further, in accordance with certain aspects of the present disclosure, the material has a porous nature. The method further includes impregnating the material with at least one o-catechol unit.

Further, in accordance with certain aspects of the present disclosure, the produced carbon-metal nanocomposites are magnetic.

Further, in accordance with certain aspects of the present disclosure, the method includes using the produced carbon-metal nanocomposites to remove phosphate from water.

Further, in accordance with certain aspects of the present disclosure, the method includes using the produced carbon-metal nanocomposites to remove arsenite/arsenate from water.

Further, in accordance with certain aspects of the present disclosure, the method includes using the produced carbon-metal nanocomposites to remove selenite/selenate from water. Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The accompanying drawings illustrate one or more embodiments of the disclosure and, together with the written description, serve to explain the principles of the disclosure. The same reference numbers may be used throughout the drawings to refer to the same or like elements the an embodiments.

DETAILED DESCRIPTION

The present disclosure will now be described more fully hereinafter with reference to the accompanying drawings, in which exemplary embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the disclosure. Additionally, some terms used in this specification are more specifically defined below.

Typically, terms such as "first", "second", "third", and the like are used for distinguishing various elements, members, regions, layers, and areas from others. Therefore, the terms such as "first", "second", "third", and the like do not limit the number of the elements, members, regions, layers, areas, or the like. Further, for example, the term "first" can be replaced with the term "second", "third", or the like.

Typically, terms such as "about," "approximately," "generally," "substantially," and the like unless otherwise indicated mean within 20 percent, preferably within 10 percent, preferably within 5 percent, and even more preferably within 3 percent of a given value or range. Numerical quantities given herein are approximate, meaning that the term "about," "approximately," "generally," or "substantially" can be inferred if not expressly stated.

Typically, "nanoscopic-scale," "nanoscopic," "nanometer-scale," "nanoscale," the "nano-" prefix, and the like refers to elements or articles having widths or diameters of less than about 1 µm, preferably less than about 100 nm in some cases. Specified widths can be smallest width (i.e. a width as specified where, at that location, the article can have a larger width in a different dimension), or largest width (i.e. where, at that location, the article's width is no wider than as specified, but can have a length that is greater), unless pointed out otherwise.

Depending on various circumstances, it may be desirable to produce nanocomposite materials capable of removing harmful materials that may be present in water such as arsenic and selenium in water soluble oxide forms. It may also be desirable to remove phosphates from contaminated water as these are responsible for eutrophication in large bodies of water, depleting the oxygen content and causing the death of water/marine organisms that thrive in those waters. It may also be desirable to produce nanocomposites that are cheap and non-toxic. It may also be desirable to produce composites in different forms (e.g., powders or grains with different diameters) and shapes (flakes, pellets etc.) for use in different water purification systems. It may also be desirable to produce water purification nanocomposites which could be removed or held in place through magnetic means.

Certain embodiments of the present disclosure can produce metal/reduced metal oxide/mixed metal oxide nanoparticles embedded in a renewable resource-based material as well as synthetic materials. Certain embodiments utilize a process that involves (a) preparation of a dispersion of metal ions, such as nickel, cobalt and iron, in certain suitable matrix materials, (b) addition of alkali to the dispersion, and (c) a thermal treatment for a time sufficient to convert the oxides of metal to reduced metal oxide nanoparticles.

Figure 1:
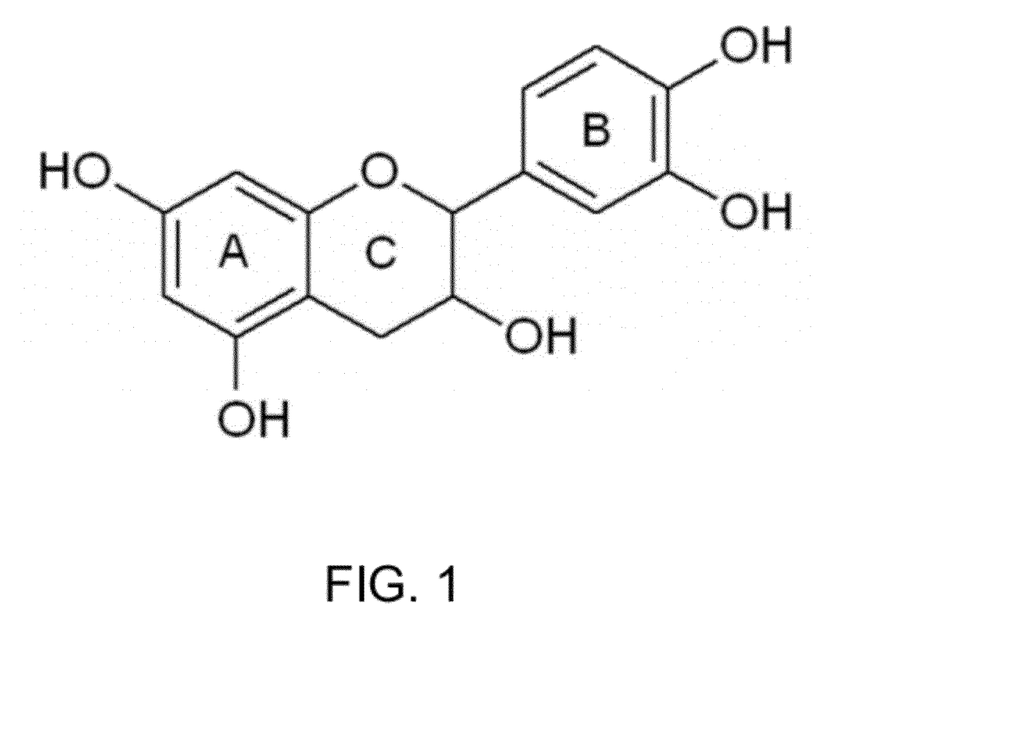
FIG. 1 schematically shows the chemical structure of a catechol unit.

Typically, catechol (or catechin) is a natural phenol antioxidant plant secondary metabolite. FIG. 1 schematically shows a catechol unit that possesses two benzene rings (called the A- and B-rings) and a dihydropyran heterocycle (the C-ring) with a hydroxyl group on carbon. Catechol units can form polymers. Typically, if a catechol polymer contains more than twenty (20) hydroxyl groups, it can be considered as condensed tannin or tannin.

In accordance with certain embodiments of the present disclosure, metal hydroxides can be converted to reduced metal oxide. In certain embodiments, suitable matrix materials for the conversion of metal hydroxides to reduced metal oxide (some of which may be magnetic) materials include wood particles (e.g., pine, cedar, oak, chestnut and cypress) and tannins (wood derivatives from a variety of sources to include mimosa, chestnut and quebracho). Using the embodiments of the present disclosure it is also possible to produce reduced metal/metal oxide (magnetic) materials embedded in cotton, silk, wool, linen, synthetic fibers, inorganic and organic porous materials to include alumina, silica, zeolite and high surface area carbon allotropes. In certain embodiments, the process requires the presence of an o-catechol (tannin-) chelated metal derivative in the matrix material, followed by an optional cross-linking with hexamethylenetetramine (HMTA). The cross-linking agent serves to increase the molecular weight by linking tannin molecules with each other as well as covalently linking tannin to the matrix material which may contain amino, hydroxyl, and other reactive groups which can react with the HMTA. The resultant molecular structure serves as a more effective metal chelant than o-catechol (e.g. tannin) and increases the amount metal chelation and dispersion property. Addition of an alkali such as sodium, potassium or ammonium hydroxide is followed by a thermal treatment which converts the hydroxide-metal complex into a reduced form of the metal.

The nanocomposites prepared in certain embodiments are useful for water purification to include the removal of phosphorus, arsenic and selenium when present as contaminants.

Figure 2:
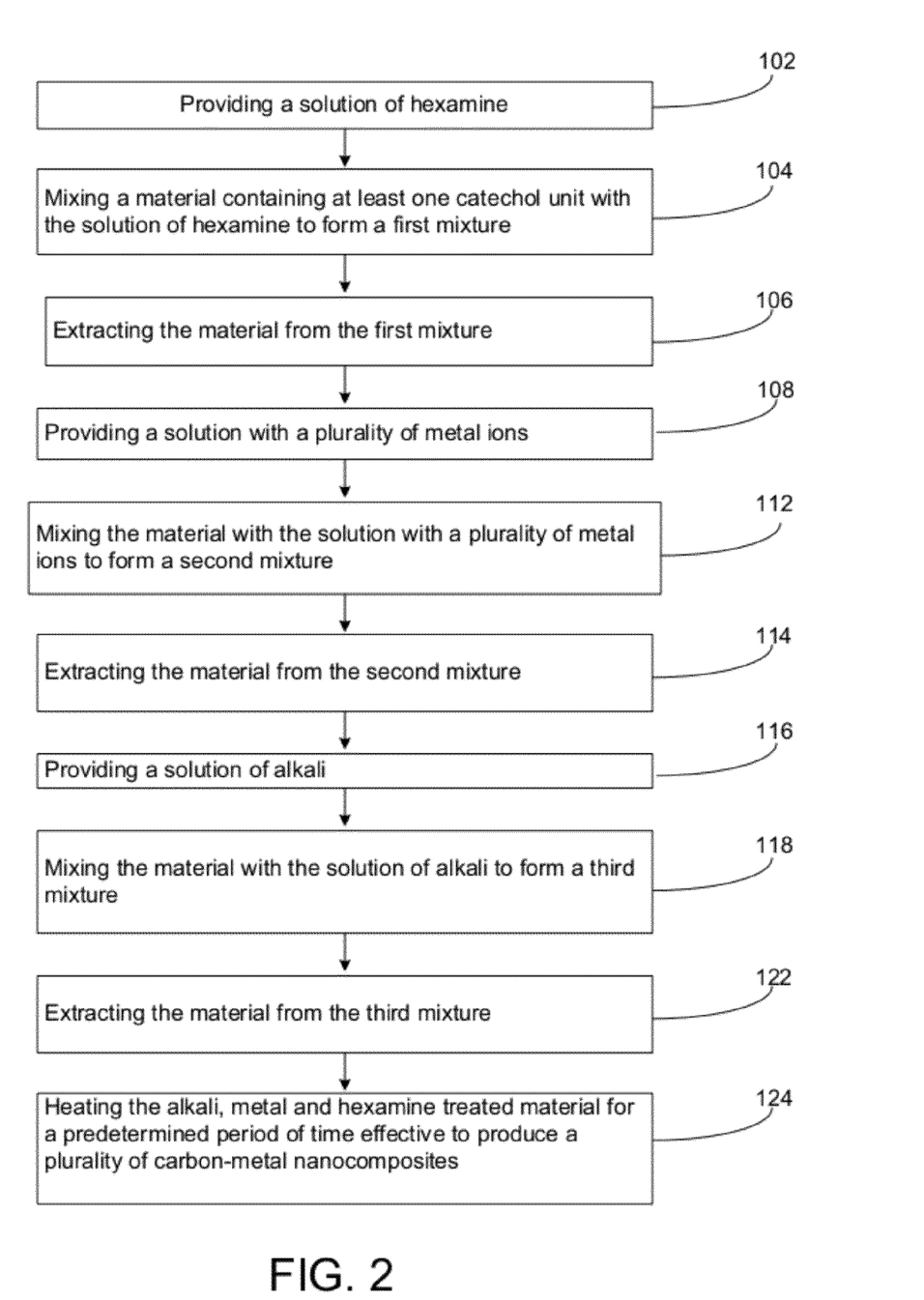
FIG. 2 schematically shows a procedure of producing carbon-metal nanocomposites according to certain embodiments of the present disclosure.

Referring to FIG. 2, a method of producing carbon-metal nanocomposites having metal nanoparticles according to certain embodiments of the present disclosure is shown. At 102, a solution of hexamine (HMTA) is provided. At 104, a material (or a matrix material) containing at least one o-catechol unit is provided. The material can have o-catechol units in its structure or can be impregnated with o-catechol units. The o-catechol units can be embedded in the material. The material is treated then with HMTA. In this specific example, the material is mixed with the solution of hexamine to form a mixture. The material reacts with hexamine and become hexamine treated. At 106, the material is extracted from the first mixture. Optionally, the material can be dried. At 108, a solution with metal ions is provided. At 112, the material is treated with the solution with metal ions. In this specific example, the material is mixed with the solution with metal ions to form a mixture. The material reacts with the metal ions and becomes metal treated. At 114, the material is extracted from the mixture. Optionally, the material can be dried. At 116, a solution of alkali is provided. At 118, the material is treated with the alkali. In this specific example, the material is mixed with the solution of alkali to form a mixture. The material reacts with alkali and becomes alkali treated. At 122, the material is extracted from the mixture. At 124, the material is heated for a predetermined period of time effective to produce carbon-metal nanocomposites having metal nanoparticles. The produced carbon-metal nanocomposites have metal nanoparticles embedded or dispersed in the material. Although this specific example shows an order for executing the processes, one skilled in the art will recognize that in some other embodiments the order of the processes can be changed. For example, the material can be treated with the metal ions and alkali together or at the same time. The material can be treated with alkali prior to being treated with metal.

In certain embodiments, the carbon-metal nanocomposites refer to nanocomposites where the carbon is not in the form of pure carbon atoms, but exists predominantly as carbon containing compounds, as in certain circumstances the material or matrix material is not (completely) carbonized.

In certain embodiments, the material or the matrix material can be treated with a solution such as by immersing the material in the solution or by dissolving the material in the solution.

In certain embodiments, the material or matrix material is chosen from materials that are porous in nature. The material or matrix material can itself contain o-catechol units. It is also possible that the material or matrix material itself does not contain o-catechol units. The material or matrix material, regardless of itself having o-catechol units or not, can be impregnated with o-catechol units. Materials such as softwood of pine, oak, chestnut, cypress, cedar, etc. in the form of chips, pellets or shavings typically themselves contain o-catechol units in their structure (such as tannin) Materials such as cotton, silk, linen, natural fibers, synthetic fibers or blends as well as inorganic and organic porous materials to include alumina, silica, zeolite and high surface area carbon allotropes typically do not contain o-catechol units before impregnation.

In certain embodiments, the material or the matrix material can be heated by subjecting the material to a microwave radiation for a period of time effective to produce a plurality of carbon-metal nanocomposites. In certain embodiments, the material or the matrix material can be heated by using conventional, non-microwave techniques at a predetermined temperature (e.g., 80° C.) for a period of time effective such that a plurality of carbon-metal nanocomposites having nanoparticles embedded or dispersed in the material or matrix material are produced. For example, the heating process can also be carried out in any conventional oven that provides radiative heating. Both laboratory and home convection ovens can be well suited for the purpose of rapid conversion.

In certain embodiments, the material or the matrix material can comprise tannin In certain embodiments, the material or the matrix material can be selected from pine, cedar, oak, chestnut, cypress and their combinations. In certain embodiments, the material or matrix material can be selected from cotton, linen, silk, wool, other natural, synthetic and blended fabrics, and their combinations. In certain embodiments, the material or the matrix material can be selected from alumina, silica, zeolite, porous carbon allotropes, and their combinations. In certain embodiments, the material or the matrix material can be selected from any of the above listed materials and their combinations.

In certain embodiments, the metal ion solution contains at least one of $Fe^{3+}$, $Fe^{2+}$, $Ni^{2+}$, $Co^{2+}$, $Au^{3+}$, $Pt^{2+}$, $Pt^{4+}$, $Al^{3+}$, $Ti^{4+}$, $Ag^+$, $Pd^{2+}$, $Cu^{2+}$, $Mn^{2+}$, $Si^{4+}$, $Zr^{+4}$, $Sb^{+2}$, $Bi^{3+}$, $Zn^{2+}$, $Al^{3+}$, $W^{6+}$, $Ba^{2+}$, $Cr^{3+}$, $Sn^{4+}$, $Mo^{6+}$.

In certain embodiments, the alkali solution contains at least one of sodium hydroxide, ammonium hydroxide, ammonia gas.

Figure 3:
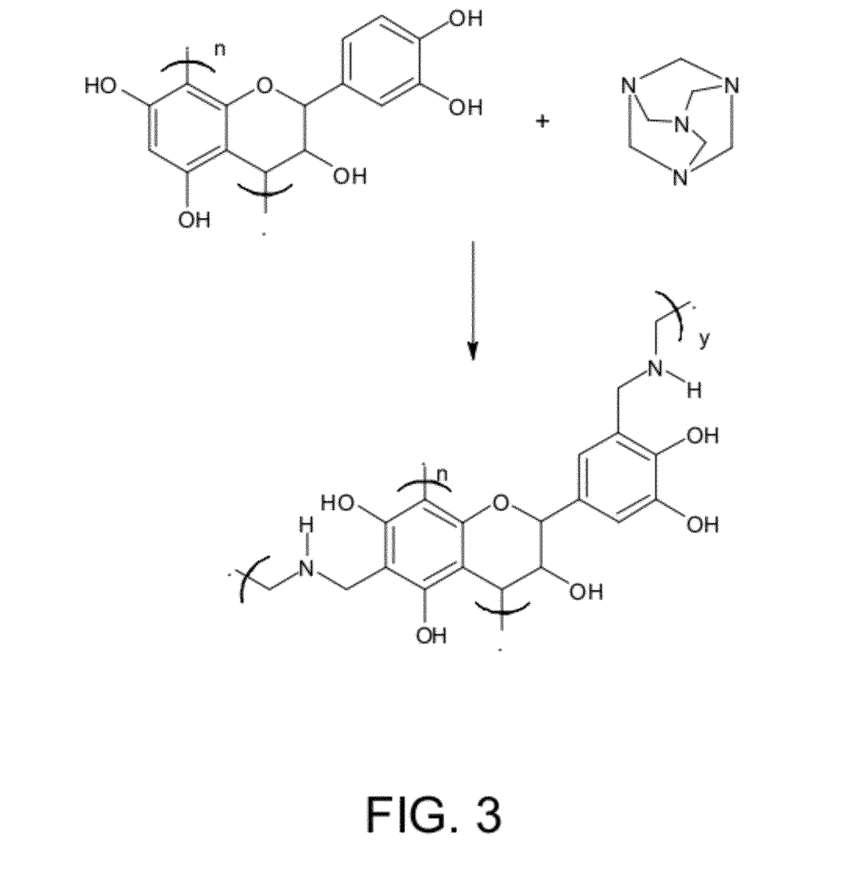
FIG. 3 schematically shows a reaction between tannin and hexamine to form cross-linked aminomethylated derivative according to certain embodiments of the present disclosure.

FIG. 3 schematically shows a reaction between tannin and hexamine to form an aminomethylated structure in certain embodiments of the present disclosure. Magnetic nanoparticles can be prepared in presence of tannin or hexamethylenetetramine (hexamine, HMTA) cross-linked tannin. The preparation can be accomplished in the presence of an inorganic or organic porous material such as cotton, linen, paper, wood, wool, silk, other natural or synthetic fabrics (with either hydrophobic or hydrophilic properties), alumina, silica, zeolite, carbon black, activated carbon, graphite, carbon nanotubes, carbon nanodiamonds, and other materials with high porosity. The hexamine not only improves the physical characteristics of the base material (e.g. the wet strength of fabric) but also provides chelating ligands to help disperse the metal ions during the synthetic procedure. The chemistry of the process involves reaction of tannin with hexamine to yield an aminomethylated cross-linked product.

HMTA can act as cross-linking agent which serves to increase the molecular weight by linking o-catechol units with each other as well as covalently linking o-catechol units to the matrix material which may contain amino, hydroxyl, and other reactive groups which can react with the HMTA. The resultant molecular structure serves as a more effective metal chelant than o-catechol (e.g., tannin) and increases the amount metal chelation and dispersion property. In certain embodiments, o-catechol material can be treated with HMTA before being treated with metal ions. Alternatively, the o-catechol containing material can be treated with HMTA and metal ions together or at the same time.

The aminomethylated tannin product shown in FIG. 3 represents an aminomethylated polyphenolic compound with both o-catechol and resorcinol group in the molecule. The aminomethylated tannin can complex metal ions such as $Fe^{3+}$, $Fe^{2+}$, $Ni^{2+}$, $Co^{2+}$, $Au^{3+}$, $Pt^{2+}$, $Pt^{4+}$, $Al^{3+}$, $Ti^{4+}$, $Ag^+$, $Pd^{2+}$, $Cu^{2+}$, $Cu^+$, $Mn^{2+}$, $Si^{4+}$, $Si^{4+}$, $Zr^{+4}$, $Sb^{+2}$, $Bi^{3+}$, $Zn^{2+}$, $Al^{3+}$, $W^{6+}$, $Ba^{2+}$, $Cr^{3+}$, $Sn^{4+}$, $Mo^{6+}$ and other metal ions. The hexamine increases the molecular weight of the oligomeric tannins by serving as a cross-linking agent and bringing the oligomeric units together in a covalent fashion. Also the amino groups in the cross-linked product provide additional sites for metal complexation and hence the dispersion of the metal ions. When hexamine is present in presence of proteins such as those present in silk, wool, etc., it promotes cross-linking between tannin and reactive amino acid side chains that might be present in the protein structure. When present with carbohydrates, the hexamine might cross-link tannin with the hydroxymethyl group of the polysaccharide. These reactions covalently link the tannin to sugars or to proteins, thereby being able to prevent the tannin molecule from being washed away during the composite use in applications such as water treatment.

Figure 4:
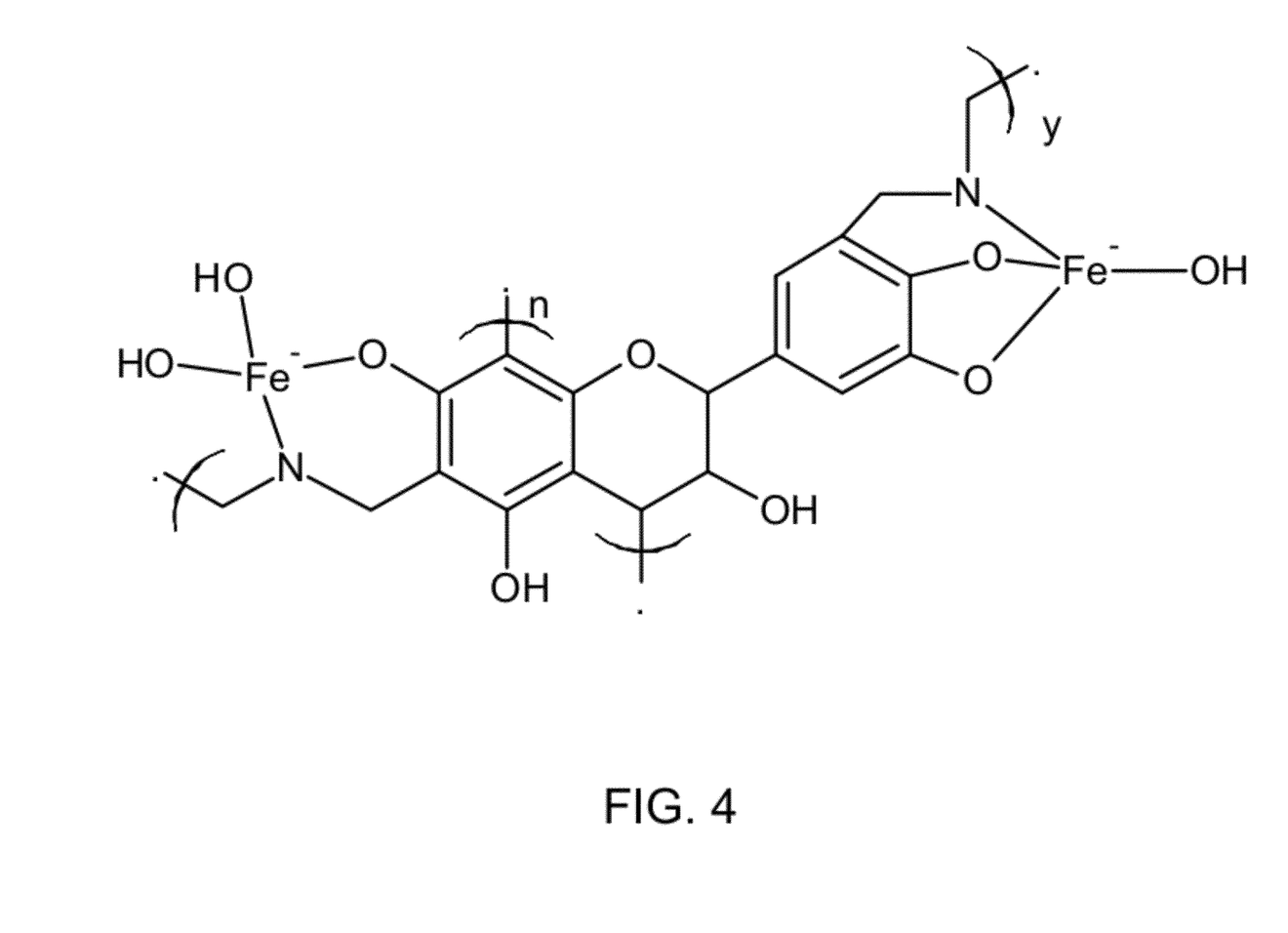
FIG. 4 schematically shows a structure of iron ions complexed to a o-catechol unit and an aminomethylated structure produced by the cross-linking reaction between hexamine and tannin in the presence of alkali according to certain embodiments of the present disclosure.

FIG. 4 schematically shows a structure of alkali treated hexamine cross-linked tannin-iron complex in certain embodiments of the present disclosure. One skilled in the art would appreciate that other metal ions can be used in place of iron ions. In this specific example, an iron ion is complexed to o-catechol unit and another iron ion is complexed to the aminomethylated part. In certain embodiments, the hexamine cross-linked tannin-iron complex is further treated with alkali. Alternatively, the metal ion treating and alkali treating can be performed together or at the same time.

In certain embodiments, the iron complex (either in presence or absence of alkali), or other similar metal ion complex produced with the method described above, can be an insoluble material and can appear as a black material. The metal ion complex can have applications in a variety of fields that require metal particle dispersions in the solid state.

It may be desirable to convert the metal complex to metal or metaloxo particles. In certain embodiments, this can be accomplished by the addition of alkali such as sodium, potassium or calcium hydroxide or by using aqueous ammonia solution or ammonia gas, followed by a thermal treatment, such as a microwave or a conventional heat treatment, for quick conversion. The different forms of metal/metal oxo nanoparticles are distinguishable because they have different and distinct X-ray diffraction (XRD) patterns. They may also be distinguishable by their different magnetic properties.

In certain embodiments, the function of tannin which contains the o-catechol unit is the complexation of metal ions and to reduce the metal hydroxide (formed by the addition of base) to reduced metal oxide (e.g., Fe or $Fe_3O_4$). Cotton which contains cellulose can complex iron ions but cannot carry out the reduction under the conditions specified in the embodiment of the process. Hence the presence of a reducing agent such as tannin (o-catechol) is required for this process. Pine, cedar, oak, etc. are materials that already contain tannin. Hence, the complexation and reduction of the metal ions are possible. With materials not containing tannin (or o-catechol units), addition of tannin is required to help not just in the complexation but also in the reduction process.

Figure 5:
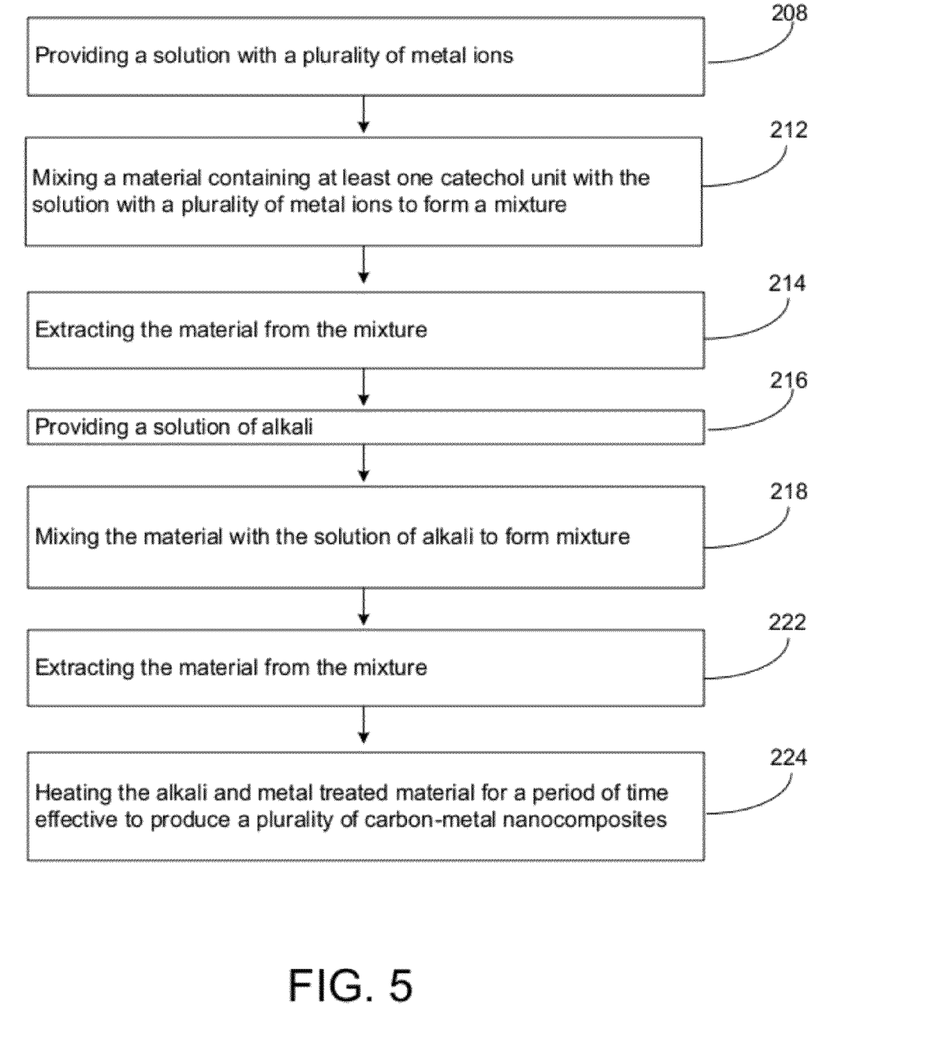
FIG. 5 schematically shows a procedure of producing carbon-metal nanocomposites according to certain embodiments of the present disclosure.

FIG. 5 schematically shows a method of producing carbon-metal nanocomposites according to certain embodiments of the present disclosure. In this example, the material or matrix material is not treated with hexamine. At step 208, a solution having a plurality of metal ions is provided. At 212, a material containing at least one o-catechol unit is treated with metal ions. For example, the material is mixed with the solution having a plurality of metal ions to form a mixture. At 214, the material is extracted from the mixture. Optionally, the material can be dried. At 216, a solution of alkali is provided. At 218, the material is treated with alkali. For example, the material is mixed with the solution of alkali to form a mixture. At 222, the material is extracted from the mixture. At 224, the material is heated for a predetermined period of time effective to produce a plurality of carbon-metal nanocomposites having metal nanoparticles embedded or dispersed in the material. Although this specific example shows an order for executing the processes, one skilled in the art will recognize that in some other embodiments the order of the processes can be changed. For example, the material can be treated with the metal ions and alkali together at the same time or alkali may be added prior to the addition of the metal ions.

Figure 6:
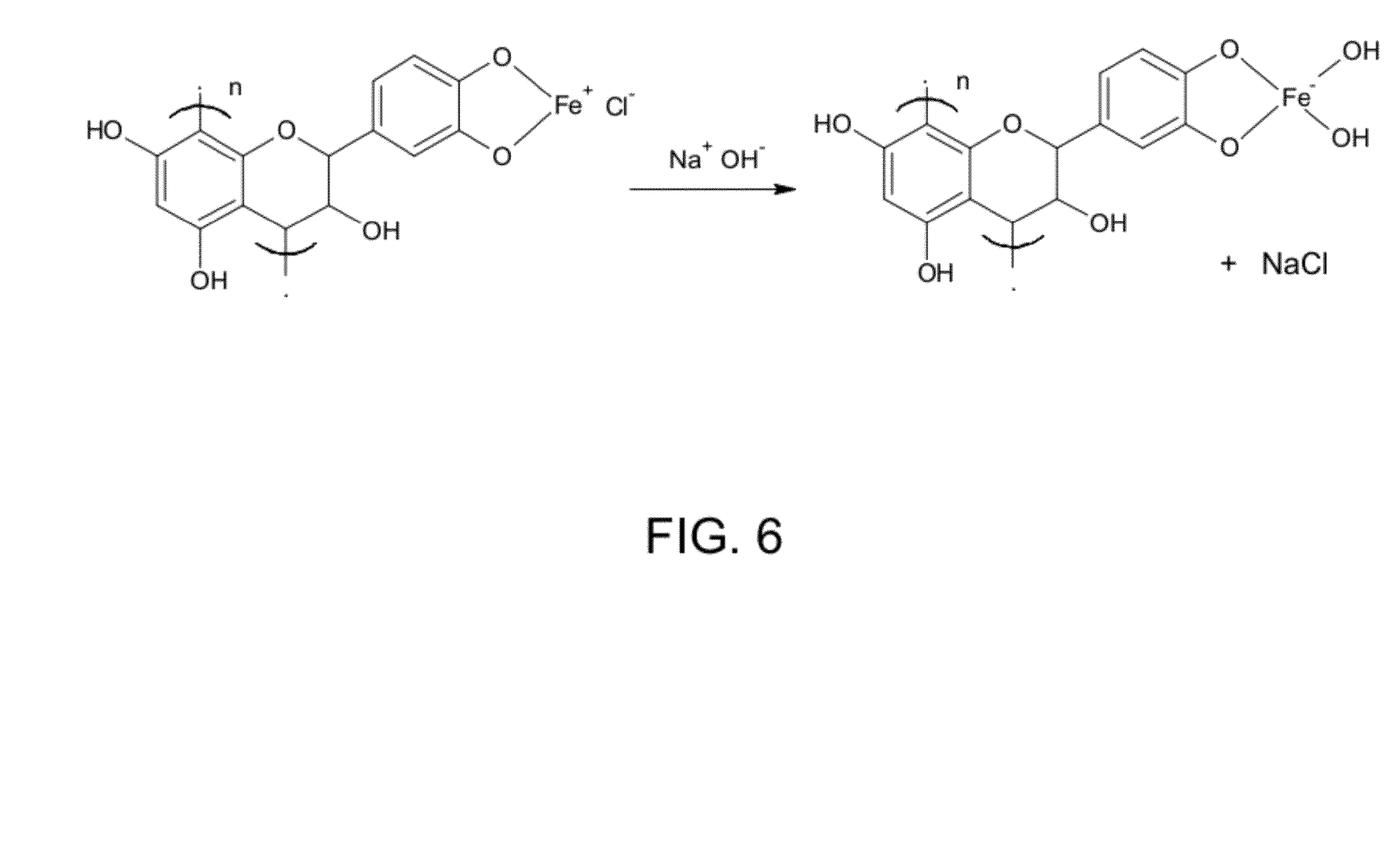
FIG. 6 schematically shows a structure of iron complexed to o-catechol unit in the presence of alkali according to certain embodiments of the present disclosure.

FIG. 6 schematically shows a reaction between the metal ions and tannin and further conversion to an oxide complex in accordance with certain embodiment of the present disclosure.

In certain embodiments, the matrix materials are chosen from materials that are porous in nature. The matrix materials are to be impregnated with metal ions. The matrix materials, such as softwood of pine, oak, chestnut, cypress, cedar etc. in the form of chips, pellets or shavings, can themselves contain o-catechol units in their structure (such as tannin) Alternatively or in addition, the matrix materials can be impregnated with o-catechol units. In certain embodiments, the matrix materials such as cotton, silk, linen, natural fibers, synthetic fibers or blends as well as inorganic and organic porous materials to include alumina, silica, zeolite and high surface area carbon allotropes do not contain o-catechol units before impregnation. The matrix materials containing the o-catechol units can be optionally cross-linked with hexamine (hexamethylenetetramine, HMTA). The matrix materials containing o-catechol units are then impregnated with metal ions (e.g. iron, cobalt, nickel, etc.). The metal ions can complex to the o-catechol and, where the o-catechol units are cross-linked, the aminomethylated structure formed by the reaction of catechol and HMTA. Addition of base causes the conversion of the metal ions to hydroxide in the resulting complex. These complexes are then heated (e.g. using microwave or non-microwave method), and convert to reduced metal oxides many of which are magnetic.

In certain embodiments, the metal salts that may be used include (ferrous and ferric) chloride, acetate, nitrate, sulfate, nickel chloride, nickel nitrate, nickel acetate, cobalt chloride, cobalt nitrate, cobalt acetate and other common salts of $Au^{3+}$, $Pt^{2+}$, $Pt^{4+}$, $Al^{3+}$, $Ti^{4+}$, $Ag^+$, $Pd^{2+}$, $Cu^{2+}$, $Cu^+$, $Mn^{2+}$, $Si^{4+}$, $Zr^{+4}$, $Sb^{+2}$, $Bi^{3+}$, $Zn^{2+}$, $Al^{3+}$, $W^{6+}$, $Ba^{2+}$, $Cr^{3+}$, $Sn^{4+}$, $Mo^{6+}$.

In certain embodiments, the produced carbon-metal nanocomposites can be used to remove phosphate, arsenite/arsenate, and/or selenite/selenate from contaminated water.

Aspects of the present teaching may be further understood in light of the following examples, which should not be construed as limiting the scope of the present teachings in any way.

Example 1

Synthesis of Carbon-Metal Nanocomposites from Pine Shavings

In this example of preparing carbon-metal nanocomposites, a 4.0 g sample of pine shavings (Alfapet pet bedding material, St. Louis, Mo.) was immersed in 25 mL of an aqueous 2.14 M $FeCl_3.6H_2O$ and soaked for 2 hours. The excess liquid was decanted and the iron chloride impregnated wood was microwaved for a minute whereupon the material appeared dry. The material was washed once and microwaved for a minute. The shavings were then immersed in 1 M ammonium hydroxide ($NH_4OH$) until the entire material seem covered and the mixture was soaked for a few minutes. The mixture was then microwaved for five minutes, a process which resulted in the evaporation of the $NH_4OH$, leaving behind dry black shavings which were magnetic as evident by the attraction to a horseshoe magnet. This material was then washed with 25 mL water (to remove any water soluble impurities). Finally the impregnated shavings were dried in air or microwaved for rapid drying.

Example 2

Synthesis of Carbon-Metal Nanocomposites from Tannin Treated Pine Shavings

In this example of preparing carbon-metal nanocomposites, the pine shavings can be treated with tannin to increase the content of catechol units in the material. A 4.0 g sample of pine shavings (Alfapet pet bedding material, St. Louis, Mo.) was immersed in 25 mL of an aqueous solution containing 2.88 g Quebracho tannin (Tannin Corp., Peabody, Mass.) and 4 mL of 1 M $NH_4OH$ and soaked for 45 minutes. The excess liquid was decanted and the shavings were microwaved. The material was then washed with water until no color was evident in the washings. The material was microwaved to dryness as in Example 1. The material was then immersed in 2.14 M $FeCl_3.6H_2O$ and soaked for 2 hours. The excess liquid was decanted and the tannin/iron chloride impregnated wood was microwaved for a minute whereupon the material appeared dry. The material was washed once and microwaved for a minute. The shavings were then immersed in 1M $NH_4OH$ till the entire material seem covered with the solution and soaked for a few minutes. The mixture was then microwaved for five minutes, a process which resulted in the evaporation of the $NH_4OH$, leaving behind dry black shavings which were magnetic as evident by the attraction to a horseshoe magnet. This material was then washed with 25 mL water (to remove any water soluble impurities). Finally the impregnated shavings were dried in air or microwaved for rapid drying.

Example 3

Synthesis of Carbon-Metal Nanocomposites from HMTA Treated Tannin

In this example, carbon-metal nanocomposites may also be prepared using tannin as the carbon source. A 2.88 g sample of Quebracho tannin was dissolved in 50 mL of water at 80° C. with stirring. To this was added 6 mL of 5 M sodium hydroxide (NaOH) and the heating was continued. After 5 minutes, 25 mL aqueous solution containing 0.28 g to 0.78 g of hexamine (HMTA) and 1.35 g to 2.8 g of $FeCl_3.6H_2O$ was added. An immediate precipitate was observed after the addition. The mixture was stirred at 80° C. for 2 hours and then cooled and filtered using a suction apparatus. The residue was washed with water and then dried. Typical yield was 3.95 g, having a black color.

Example 4

Synthesis of Carbon-Ni Nanocomposites and Carbon-Co Nanocomposites from HMTA Treated Tannin In this example of preparing carbon-metal nanocomposites, a 2.88 g sample of Quebracho tannin was dissolved in 50 mL of water at 80° C. with stirring. To this was added 6 mL of 5 M NaOH and the heating was continued. After 5 minutes, 25 mL aqueous solution containing 0.0025 to 0.01 moles of hexamine (HMTA) and 0.01 moles of either $NiCl_2.6H_2O$ or $CoCl_2.6H_2O$ was added. An immediate precipitate was observed after the addition of the metal salt. The mixture was stirred at 80° C. for 2 hours and then cooled and filtered using a suction apparatus. The residue was washed with water and then dried. Typical yield was around 3.5-4.0 g, having a black color.

The reaction may also be carried out in presence of a porous material, including alumina, silica, zeolites, soft wood, cotton, wool, silk, linen and other porous materials that exhibit high surface area. High surface area carbon, carbon nanotubes, graphite and other ordered carbon and non-carbon structures can also be included in the formation of the composite.

Figure 7:
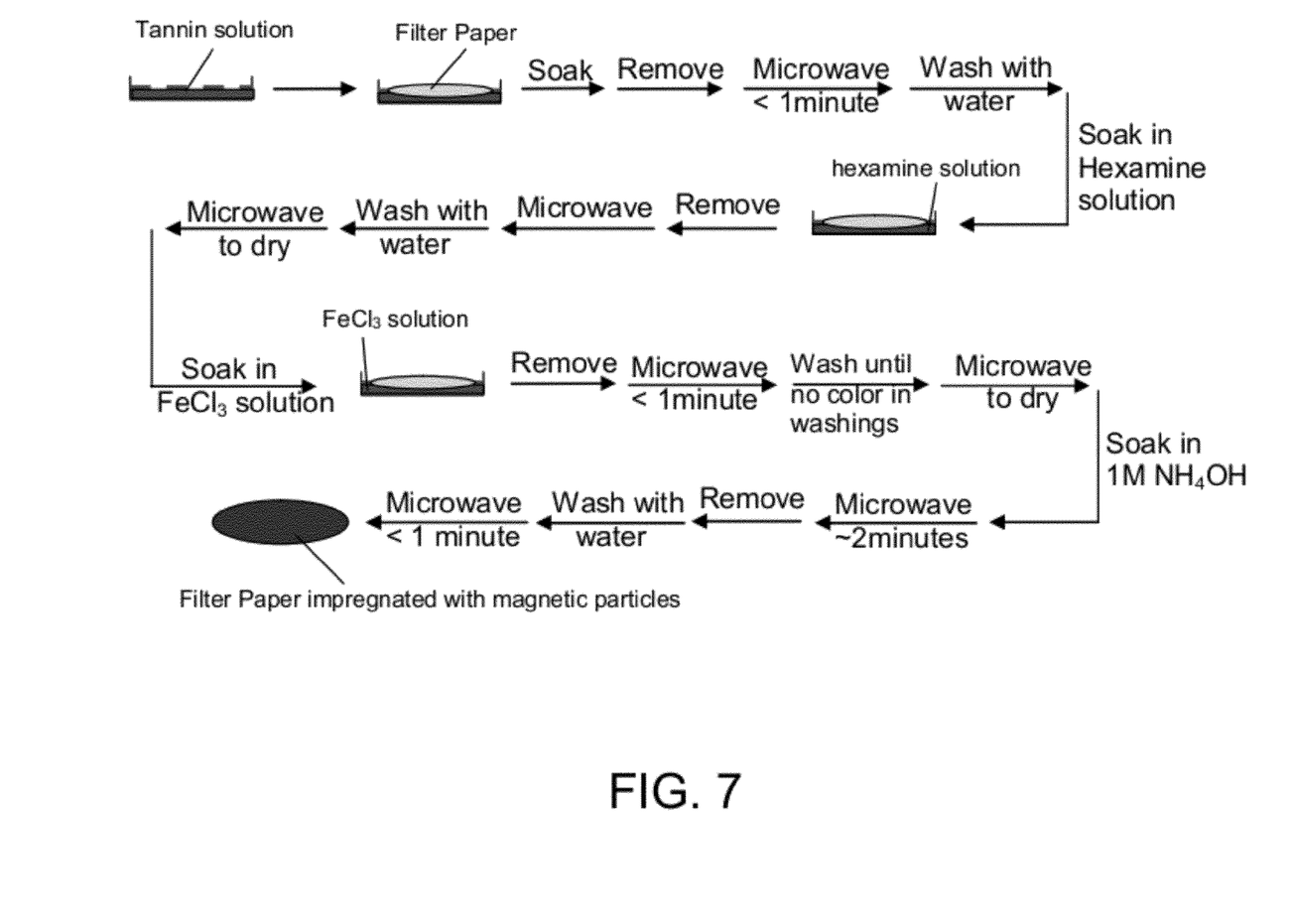
FIG. 7 schematically shows a procedure for impregnation of magnetite into a porous material according to certain embodiments of the present disclosure.

Referring to FIG. 7, metal-carbon nanocomposites were prepared according to one embodiment of the present disclosure. This example discloses the preparation of hexamine cross-linked tannin-based metal/metal oxo particles in presence of a porous filter paper (Whatman #4). The process involves a series of impregnation and microwave treatment. The last treatment with ammonia is optional but is necessary for the rapid conversion to magnetic nanoparticles. An alternate procedure is a longer heating for 1 to 2 hours at 80° C. or more.

Referring to FIG. 7, in this embodiment, a filter paper was immersed in a tannin solution to form a tannin treated paper. Then the tannin treated filter paper was removed from the tannin solution, microwaved for less than one minute to be dried, washed with water and soaked in HMTA solution sequentially to form a HMTA and tannin treated filter paper. In the next step, the HMTA and tannin treated filter paper was removed from the HMTA solution, microwaved to be dried, washed with water, microwaved to be dried, and immersed in $FeCl_3$ solution to form a $FeCl_3$, HMTA and tannin treated filter paper. Afterwards, the $FeCl_3$, HMTA and tannin treated filter paper was removed from the $FeCl_3$ solution, microwaved for less than one minutes to be dried, wash until no color in washings, microwaved to be dried, and soaked in 1 M $NH_4OH$ solution sequentially to form a $NH_4OH$, $FeCl_3$, HMTA and tannin treated filter paper. In the last step, the $NH_4OH$, $FeCl_3$, HMTA and tannin treated filter paper was microwaved for about two minutes, removed, washed with water, and microwaved for less than 1 minutes to be dried, and produced a filter paper impregnated with magnetic particles.

Example 5

Use of Carbon-Metal Nanocomposites for Removing Phosphate from Water

Metal impregnated magnetic carbon-metal nanocomposites made by tannin- and hexamine cross-linked tannin typically are effective in the removal of arsenic, phosphorus and selenium from contaminated water. In this example, the carbon-metal nanocomposites in the present disclosure can be used for the removal of phosphorus.

In this example, different amounts, 25 mg, 100 mg and 150 mg of impregnated filter paper made according to the scheme in FIG. 4 were added to 50 mL of aqueous solution containing 10 mg phosphate per liter at pH7. The mixture was stirred for 24 hours at room temperature and then passed through a 0.45 micron cellulose acetate filter paper using vacuum suction.

The filtrate was then analyzed for phosphate concentration by following a published standard operating procedure for the determination of phosphate in natural waters using a visible spectrometer, which is useful in the range of 0.01 to 2.0 mg/L. (Bender M. R., Wood, C. W. Total Phosphorous in Residual Materials. In Methods of Phosphorus Analysis for Soils, Sediments, Residuals, and Waters. Pierzynski, G. M. Ed. Southern Cooperative Series Bulletin No. #396. 2000). The method relies on a colorimetric method whereby orthophosphate (inorganic phosphate) is reacted with ammonium molybdate and potassium antimonyl tartrate in acidic condition to form a heteropolyacid-phosphomolybdic acid. This compound is further reduced to a highly colored molybdenum blue dye which has as intense absorption at 880 nm, measured spectrophotometrically using a cell with a path length of 2.5 cm or longer. Chromium and arsenic interfere but was not be present in our samples.

Results obtained showed that the 25 mg sample was able to remove 85% of the phosphate from the 10 mg/L stock solution while the 100 and 200 mg samples removed over 99.6% of the phosphate (beyond the detection limit of the procedure used).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

Further, one or more embodiments of the present disclosure are directed to one or more of the following items:

1. A composite prepared by the thermal or microwave treatment of a base (sodium, calcium, ammonium hydroxide or ammonia gas) treated, metal complexed to o-catechol or complexed to a material containing an o-catechol unit.

2. A composite prepared by the thermal or microwave treatment of a base treated, metal complexed to o-catechol or complexed to a material containing an o-catechol unit such as tannin.

3. A composite prepared by the thermal or microwave treatment of a base treated, metal complexed to o-catechol or complexed to a material containing an o-catechol unit such as tannin present in a matrix.

4. A magnetic composite prepared by the thermal or microwave treatment of a base treated, iron complexed to o-catechol or complexed to a material containing an o-catechol unit such as tannin present in a matrix.

5. A composite prepared by the thermal or microwave treatment of a base treated, metal complexed to o-catechol or complexed to a material containing an o-catechol unit such as tannin present in a matrix, where the metal is $Fe^{3+}$, $Fe^{2+}$, $Ni^{2+}$, $Co^{2+}$, $Au^{3+}$, $Pt^{2+}$, $Pt^{4+}$, $Al^{3+}$, $Ti^{4+}$, $Ag^{+}$, $Pd^{2+}$, $Cu^{2+}$, $Cu^{+}$, $Mn^{2+}$, $Si^{4+}$, $Zr^{+4}$, $Sb^{+2}$, $Bi^{3+}$, $Zn^{2+}$, $Al^{3+}$, $W^{6+}$, $Ba^{2+}$, $Cr^{3+}$, $Sn^{4+}$, $Mo^{6+}$.

6. A composite prepared by the thermal or microwave treatment of a base treated, metal complexed to o-catechol or complexed to a material containing an o-catechol unit such as tannin present in a matrix including wood (pine, cedar, oak, chestnut and cypress) and paper.

7. A composite prepared by the thermal or microwave treatment of a base treated, metal complexed to o-catechol or complexed to a material containing an o-catechol unit such as tannin present in a matrix including cotton, linen, silk, wool and other natural, synthetic and blended fabrics.

8. A composite prepared by the thermal or microwave treatment of a base treated, metal complexed to o-catechol or complexed to a material containing an o-catechol unit such as tannin present in a matrix including alumina, silica, zeolite and porous carbon allotropes.

9. A magnetic composite prepared by the thermal or microwave treatment of a base treated, iron complexed to o-catechol or complexed to a material containing an o-catechol unit such as tannin present in a matrix including wood (pine, cedar, oak, chestnut and cypress) and paper.

10. A magnetic composite prepared by the thermal or microwave treatment of a base treated, iron complexed to o-catechol or complexed to a material containing an o-catechol unit such as tannin present in a matrix including cotton, linen, silk, wool and other natural, synthetic and blended fabrics.

11. A magnetic composite prepared by the thermal or microwave treatment of a base treated, iron complexed to o-catechol or complexed to a material containing an o-catechol unit such as tannin present in a matrix including alumina, silica, zeolite and porous carbon allotropes.

12. A composite prepared by the thermal or microwave treatment of a base treated, hexamine cross-linked metal complexed to o-catechol or complexed to a material containing an o-catechol unit such as tannin present in a matrix.

13. A composite prepared by the thermal or microwave treatment of a base treated, hexamine cross-linked metal complexed to o-catechol or complexed to a material containing an o-catechol unit such as tannin present in a matrix where the metal is Fe3+, Fe2+, Ni2+, Co2+, Au3+, Pt2+, Pt4+, Al3+, Ti4+, Ag+, Pd2+, Cu2+, Cu+, Mn2+, Si4+, Zr+4, Sb+2, Bi3+, Zn2+, Al3+, W6+, Ba2+, Cr3+, Sn4+, Mo6+.

14. A magnetic composite prepared by the thermal or microwave treatment of a base treated, metal complexed to hexamine cross-linked o-catechol or a material containing an o-catechol unit such as tannin present in a matrix where the metal is iron.

15. A magnetic composite prepared by the thermal or microwave treatment of a base treated, metal complexed hexamine cross-linked o-catechol or a material containing an o-catechol unit such as tannin present in a matrix including wood (pine, cedar, oak, chestnut and cypress) and paper.

16. A magnetic composite prepared by the thermal or microwave treatment of a base treated, iron complexed hexamine cross-linked o-catechol or a material containing an o-catechol unit such as tannin present in a matrix to include silk, wool and other natural, synthetic and blended fabrics.

17. A magnetic composite prepared by the thermal or microwave treatment of a base treated, metal complexed hexamine cross-linked metal o-catechol or a material containing an o-catechol unit such as tannin present in a matrix to include alumina, silica, zeolite and porous carbon allotropes.

18. All products in items 1 through 17 above for the removal of dissolved phosphorous from contaminated water.

19. All products in items 1 through 17 above for the removal of dissolved arsenic from contaminated water.

20. All products in items 1 through 17 above for the removal of dissolved selenium from contaminated water.

21. All products in items 1 through 17 above for the removal of dissolved arsenic, phosphorus and selenium from contaminated water.

The embodiments are chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method of producing carbon-metal nanocomposites, comprising:
   (a) treating a material containing at least one o-catechol unit with a first solution of hexamine such that the material becomes hexamine treated;
   (b) treating the material with a second solution having a plurality of metal ions such that the material becomes metal treated;
   (c) treating the material with a third solution of alkali such that the material becomes alkali treated; and
   (d) heating the alkali, metal and hexamine treated material after (a), (b), and (c) for a predetermined period of time such that a plurality of carbon-metal nanocomposites having metal nanoparticles dispersed in the material are produced.

2. The method of claim 1, further comprising:
   extracting the hexamine treated material from the first solution;
   extracting the metal treated material from the second solution; and
   extracting the alkali treated material from the third solution.

3. The method of claim 2, further comprising drying the extracted material in each of (a), (b), and (c).

4. The method of claim 1, further comprising impregnating the material with at least one o-catechol unit.

5. The method of claim 1, wherein (d) comprises subjecting the alkali, metal and hexamine treated material to microwave radiation for a predetermined period of time effective to produce the plurality of carbon-metal nanocomposites.

6. The method of claim 1, wherein (d) comprises heating the alkali, metal and hexamine treated material using a non-microwave technique at a predetermined temperature for a predetermined period of time effective to produce the plurality of carbon-metal nanocomposites.

7. The method of claim 1, wherein the material comprises tannin.

8. The method of claim 1, wherein the material further comprises a matrix material selected from the group consisting of pine, cedar, oak, chestnut, cypress and a combination thereof.

9. The method of claim 1, wherein the material further comprises a matrix material selected from the group consisting of cotton, linen, silk, wool and a combination thereof.

10. The method of claim 1, wherein the material further comprises a matrix material selected from the group consisting of alumina, silica, zeolite, porous carbon allotropes and a combination thereof.

11. The method of claim 1, wherein the plurality of metal ions are selected from the group consisting of $Fe^{3+}$, $Fe^{2+}$, $Ni^{2+}$, $Co^{2+}$, $Au^{3+}$, $Pt^{2+}$, $Pt^{4+}$, $Al^{3+}$, $Ti^{4+}$, $Ag^+$, $Pd^{2+}$, $Cu^{2+}$, $Cu^+$, $Mn^{2+}$, $Si_{4+}$, $Zr^{+4}$, $Sb^{+2}$, $Bi^{3+}$, $Zn^{2+}$, $Al^{3+}$, $W^{6+}$, $Ba^{2+}$, $Cr^{3+}$, $Sn^{4+}$ and $Mo^{6+}$.

12. The method of claim 1, wherein the produced carbon-metal nanocomposites are magnetic.

13. The method of claim 1, wherein the solution of alkali comprises at least one of sodium hydroxide, ammonium hydroxide, and ammonia gas.

14. A method, comprising:
   (a) treating a material containing at least one o-catechol unit with a plurality of metal ions, the material being a matrix material;
   (b) treating the material with alkali; and
   (c) heating the alkali and metal treated material for a predetermined period of time effective such that a plurality of carbon-metal nanocomposites having metal nanoparticles dispersed in the material are produced.

15. The method of claim 14, wherein (a) comprises immersing the material in a first solution having the plurality of metal ions.

16. The method of claim 15, wherein (b) comprises immersing the material in a second solution having the alkali.

17. The method of claim 16, further comprising:
   extracting the metal treated material from the first solution; and
   extracting the alkali treated material from the second solution.

18. The method of claim 17, further comprising drying the extracted material.

19. The method of claim 14, wherein the material has a porous nature.

20. The method of claim 19, further comprising impregnating the material with at least one o-catechol unit.

21. The method of claim 20, wherein the impregnating the material comprises immersing the material in a fourth solution having tannin.

22. The method of claim 21, further comprising treating the alkali and metal treated material with alkali.

23. The method of claim 22, further comprising heating the metal and twice alkali treated material such that the plurality of carbon-metal nanocomposites that are magnetic are produced.

24. The method of claim 14, further comprising treating that alkali treated material with hexamine.

25. The method of claim 14, wherein (c) comprises subjecting the alkali and metal treated material to microwave radiation for a predetermined period of time effective to produce the plurality of carbon-metal nanocomposites.

26. The method of claim 14, wherein (c) comprises heating the alkali and metal treated material using a non-microwave technique at a predetermined temperature for a predetermined period of time effective to produce the plurality of carbon-metal nanocomposites.

27. The method of claim 14, wherein the material comprises tannin.

28. The method of claim 27, wherein the material further comprises a matrix material selected from the group consisting of pine, cedar, oak, chestnut, cypress and a combination thereof.

29. The method of claim 27, wherein the material further comprises a matrix material selected from the group consisting of cotton, linen, silk, wool and a combination thereof.

30. The method of claim 27, wherein the material further comprises a matrix material selected from the group consisting of alumina, silica, zeolite, porous carbon allotropes and a combination thereof.

31. The method of claim 14, wherein the plurality of metal ions are selected from the group consisting of $Fe^{3+}$, $Fe^{2+}$, $Ni^{2+}$, $Co^{2+}$, $Au^{3+}$, $Pt^{2+}$, $Pt^{4+}$, $Al^{3+}$, $Ti^{4+}$, $Ag^+$, $Pd^{2+}$, $Cu^{2+}$, $Cu^+$, $Mn^{2+}$, $Si^{4+}$, $Zr^{+4}$, $Sb^{+2}$, $Bi^{3+}$, $Zn^{2+}$, $Al^{3+}$, $W^{6+}$, $Ba^{2+}$, $Cr^{3+}$, $Sn^{4+}$ and $Mo^{6+}$.

32. The method of claim 14, wherein the produced carbon-metal nanocomposites are magnetic.

33. The method of claim 14, wherein the solution of alkali comprises at least one of sodium hydroxide, ammonium hydroxide, and ammonia gas.

34. The method of claim 14, further comprising using the produced carbon-metal nanocomposites to remove phosphate from water.

35. The method of claim 14, further comprising using the produced carbon-metal nanocomposites to remove arsenite/arsenate from water.

36. The method of claim 14, further comprising using the produced carbon-metal nanocomposites to remove selenite/selenate from water.

37. A method, comprising:
(a) dissolving a material containing at least one o-catechol unit in water to form a o-catechol containing solution, and adding an alkali containing solution to the o-catechol containing solution, wherein the material is a matrix material;
(b) treating the material with a plurality of metal ions; and
(c) heating the alkali and metal treated material for a predetermined period of time effective such that a plurality of carbon-metal nanocomposites having metal nanoparticles dispersed in the material are produced.

* * * * *